US009384780B2

(12) United States Patent
Zhang et al.

(10) Patent No.: US 9,384,780 B2
(45) Date of Patent: *Jul. 5, 2016

(54) SYSTEM AND METHOD FOR VIDEO SUMMARIZATION AND NAVIGATION BASED ON STATISTICAL MODELS

(71) Applicants: Xiaoping Zhang, Toronto (CA); Junfeng Jiang, North York (CA)

(72) Inventors: Xiaoping Zhang, Toronto (CA); Junfeng Jiang, North York (CA)

( * ) Notice: Subject to any disclaimer, the term of this patent is extended or adjusted under 35 U.S.C. 154(b) by 98 days.

This patent is subject to a terminal disclaimer.

(21) Appl. No.: 14/246,869

(22) Filed: Apr. 7, 2014

(65) Prior Publication Data

US 2014/0308023 A1   Oct. 16, 2014

Related U.S. Application Data

(63) Continuation of application No. 13/492,510, filed on Jun. 8, 2012, now Pat. No. 8,693,850.

(60) Provisional application No. 61/494,973, filed on Jun. 9, 2011.

(51) Int. Cl.

| | |
|---|---|
| *H04N 5/783* | (2006.01) |
| *H04N 9/80* | (2006.01) |
| *G11B 27/00* | (2006.01) |
| *H04N 5/14* | (2006.01) |
| *H04N 5/93* | (2006.01) |
| *H04N 21/44* | (2011.01) |
| *H04N 21/472* | (2011.01) |
| *H04N 21/845* | (2011.01) |
| *G06F 17/30* | (2006.01) |
| *H04N 9/82* | (2006.01) |

(52) U.S. Cl.
CPC ........ *G11B 27/005* (2013.01); *G06F 17/30846* (2013.01); *H04N 5/147* (2013.01); *H04N 5/783* (2013.01); *H04N 5/93* (2013.01); *H04N 21/44008* (2013.01); *H04N 21/47217* (2013.01); *H04N 21/8456* (2013.01); *H04N 9/8227* (2013.01)

(58) Field of Classification Search
USPC .................................. 386/239–248, 343–352
See application file for complete search history.

(56) References Cited

U.S. PATENT DOCUMENTS

| | | | | |
|---|---|---|---|---|
| 7,152,209 B2 * | 12/2006 | Jojic | ................. | G06F 17/30825 382/305 |
| 7,489,726 B2 * | 2/2009 | Vetro | ............... | H04N 21/21805 375/240.01 |
| 2008/0068496 A1 * | 3/2008 | Jeong | ..................... | H04N 19/87 348/441 |

* cited by examiner

*Primary Examiner* — Hung Dang
(74) *Attorney, Agent, or Firm* — K&L Gates LLP

(57) ABSTRACT

The disclosed method calculates video time density functions based on inter-frame mutual information or other similarity measures. The method includes acquiring a video sequence from memory, computing mutual information or other similarity measures between two consecutive frames of the video sequence, and constructing a video temporal density function based on the mutual information or similarity measures. The method enables fast navigation of the video sequence by performing a temporal quantization of the video time density function to determine a set of quanta. The video sequence can be navigated using the nearest neighbor video frames to the set of quanta. The method enables thumbnail extraction of a video sequence using statistical modeling by performing a temporal quantization of the video time density function to segment video sequence in time domain and using mixture (such as Gaussian mixture and ICA mixture) vector quantization to find the sample frames for each temporal segment.

21 Claims, 14 Drawing Sheets
(10 of 14 Drawing Sheet(s) Filed in Color)

US 9,384,780 B2

SYSTEM AND METHOD FOR VIDEO SUMMARIZATION AND NAVIGATION BASED ON STATISTICAL MODELS

PRIORITY CLAIM

This application is a continuation of U.S. patent application Ser. No. 13/492,510, filed Jun. 8, 2012, which is a non-provisional application of, claims priority to and the benefit of U.S. Provisional Patent Application No. 61/494,973, filed Jun. 9, 2011, the entire contents of which are incorporated herein by reference.

COPYRIGHT NOTICE

A portion of the disclosure of this patent document contains material that is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

TECHNICAL FIELD

This invention relates generally to the research field of video understanding and indexing, and more particularly to a method to navigate and summarize digital video.

BACKGROUND OF THE INVENTION

With the rapid technology advances in digital television, multimedia, and Internet, there has recently been an increase of the amount of digital image, audio, video data available for consumption by video consumers. Among all the media types, video is frequently characterizing as the most challenging type of media to manipulate, as it combines all other media information into one single data stream. In recent years, due in part to the decreasing cost of storage devices, higher transmission rates, and improved compression techniques, digital videos are becoming available at an ever-increasing rate. Thanks to the increasing availability of computing resources and the popularity of so-called Web 2.0 related technologies, a growing number of user-centric applications are available that allow ordinary people to record, edit, deliver and publish their own home-made digital videos on social web or networks (e.g., YouTube). As a result, the interaction with videos has become an important part of the daily lives of modern individuals, and many related applications have emerged.

Currently, as a key element of multimedia computing, digital video has been widely employed in many industries as well as in various systems. However, because of the tendency for videos to have long durations and an unstructured format, efficient access to video, especially video content-based access, is difficult to achieve. In other words, the increasing availability of digital video has not been accompanied by an increase in its accessibility. The abundance of video data makes it increasingly difficult for users to efficiently manage and navigate their video collections. Therefore, a need has arisen for the development of efficient and effective automated techniques for users to navigate and analyze video content.

The field of video summarization aims to organize video data into a compact form and to extract meaningful information from that video data. In general, current video summarization technologies can be categorized into two main types: static video summarization and dynamic video summarization.

Static video summarization generally refers to segmenting a whole video stream into several partitions (i.e., video shots). For each segment or shot, one or more frames are extracted as the key frames. The result of such static summarization is to arrange those key frames sequentially or hierarchically. Various static video summarization techniques are described in the article "A novel video summarization based on mining the story-structure and semantic relations among concept entities" (IEEE Transactions Multimedia, vol. 11, No. 2, pp. 295-312, 2009) and the article "Hierarchical video summarization and content description joint semantic and visual similarity" (ACM Multimedia System, vol. 9, No. 1, 2003).

Although static video summarization can offer users a comprehensive view of video by generating a visual abstract of video content in a concise and informative way, it is susceptible to a smoothness problem—that is, users may feel uncomfortable while browsing the results due to a lack of smoothness while browsing. For example, given a video with long duration, it is common to generate thousands of key frames using the above static methods. This characteristic is evidenced by the specific example that in the feature-length movie Terminator 2: Judgment Day, there are 300 shots in a 15-minute video segment, and the movie lasts 139 minutes. The static key frames' sequential layout for such a complex feature length video may thus be meaningless for users' semantic video content understanding.

Dynamic video summarization is an alternative solution to generate so-called video skims (temporal continuous segments) from an original video stream. An example of such dynamic video summarization, known as hidden Markov model (HMM), was used to generate a video skim that was described in the article by S. Benini et al. (Hidden Markov models for video skim generation, Proc. of 8th International Workshop on Image Analysis for Multimedia Interactive Services, June 2007). A video skim method considering different features (audio, visual, and text) together was proposed in the article "Video skimming and characterization through the combination of image and language understanding" (Proc. of IEEE International Workshop on Content-based Access Image Video Data Base, pp. 61-67, January 1998). The authors in the article "A user attention model for video summarization" (Proc. of 10th ACM Multimedia, pp. 533-542, December 2002) tried to create video skims using attention models.

In general, the high computational complexity of such dynamic video summarization techniques makes them infeasible in practice. For example, the above HMM-based method has to estimate the model parameters first before they can be applied to create video skims. In current video players, the uniform fast-forward mode is still the only way for users' rapid video navigation. The traditional fast-forward is a sampling procedure to play and skip video frames uniformly. However, the uniform sampling may not be effective to capture the semantic information of video data.

In addition, most existing summarization methods are video shot-based. However, the physical structure-based video analysis is not directly related to the semantic video content understanding.

Therefore, a method is needed that grasps the important video content ignored by the traditional fast-forward mode effectively and makes the content-based rapid video navigation feasible in practice.

There is a need to overcome the disadvantages described above. There is also a need to provide improvements to known video summarization techniques.

SUMMARY OF THE DISCLOSURE

The system and methods disclosed herein disclose a new research framework using so-called video time density function (VTDF) and statistical modeling to summarize various video content in a non-uniform way.

In particular, the system and methods disclosed herein operate to formulate the rapid video navigation problem as a generic sampling problem and to construct a VTDF using the inter-frame mutual information or any other similarity measure to model the temporal dynamics of video data. Based on the constructed VTDF, several methods and solutions are proposed to solve the video summarization and navigation problems effectively and efficiently.

In a first embodiment, repeated weighted boosting search (RWBS) is combined with VTDF to summarize the video content in a non-uniform way.

In another embodiment, a new temporal quantization method is disclosed which is inspired by the vector quantization concept to find an optimal video summary. Rate-Distortion theory is integrated into methods of this embodiment for quantization distortion evaluation.

In another embodiment, an extension of VTDF-based temporal quantization is disclosed in which motion-based temporal dynamics of video data (MVTDF) are explored.

In another embodiment, a video player is disclosed to demonstrate the feasibility of the proposed video summarization techniques. In this embodiment, the sampled frames can be fed into the video player for fast-forward playback. Before committing time to the original video, users can do rapid navigation in two fast-forward modes.

In another embodiment, the disclosed VTDF is applied to segment video data in time domain. For each temporal segment in this embodiment, statistical models (such as Gaussian mixture and ICA mixture) are applied to explore the spatial characteristics of the video and to generate video thumbnails.

In various embodiments, the items described above (to simple, temporal quantization sampling, TQS) can be addressed in two aspects, whether the number of sample frames is predefined or not. The first three items described above are used in various embodiments to find an optimal solution to sample predefined number of frames. In an embodiment, a video player according to the fourth item described above can be used to demonstrate the feasibility of the proposed methods. Unlike existing model-based methods, the items discussed so far do not need training data and parameter estimation. It is independent of the domain features and knowledge.

In an embodiment, the fifth item described (to simple, video thumbnail extraction, VTE) is different from others because it generates a compact video summary when the number of sample frames is not predefined. According to this item, two mixture models are developed: a Gaussian mixture and an ICA mixture. Accordingly, the system and methods disclosed herein include two mixture model vector quantization methods, called Gaussian Mixture Vector Quantization ("GMVQ") and ICA Mixture Vector Quantization ("ICAMVQ").

In various embodiments, the system and methods disclosed herein improve known systems and methods for TQS because they formulate a simple VTDF to describe the video temporal dynamic intensity. Different from the emphasized aspects (shot boundary, scene change) in known techniques, embodiments of the present disclosure leverage an efficient vector quantization method to solve the video summarization problem from a new perspective: given any specific time (i.e., number of sampling frames), the goal is to find the best samples of the video. According to the temporal quantization, embodiments of the methods and systems disclosed herein rely on VTDF and use RWBS to solve the rapid video summarization/navigation problem. In a further embodiment, the integration of these techniques with a video player demonstrates the potential of the disclosed methods and systems in practice. Subjective evaluations show that more semantic information can be grasped in our method compared with uniform sampling.

For VTE, one goal of the VTDF-based statistical model is to find an optimal compact video summary effectively. This VTDF-based temporal quantization aims to explore the temporal characteristics of video data and find the optimal number of temporal segments. In various embodiments, the disclosed statistical model aims to explore spatial characteristics of video data and find the optimal number of sample frames for each segment.

SUMMARY OF THE INVENTION

In one embodiment, the method disclosed herein is directed to fast navigation of a video sequence using a video temporal density function including the steps of:
a) Acquiring a video sequence from a memory or database;
b) Computing the mutual information or any other similarity measure between two consecutive frames of the video sequence;
c) Constructing a video temporal density function based on the mutual information or any other similarity measure between frames;
d) Performing a temporal quantization of the video temporal density function to determine a set of quanta;
e) Navigating the video sequence using the video frames that are the nearest neighbors to the set of quanta (such as for the purpose of TQS); and
f) Exploring spatial characteristics of each temporal segment by applying statistical model (such as for the purpose of VTE).

With regard to TQS, the instant disclosure has the advantage in various embodiments that it is independent of the domain features and knowledge. It has the additional advantage in various embodiments that no matter given any specific time constraint (number of sampling frames) or not, it can automatically find the best samples of the video to enable rapid video navigation.

With regard to VTE, the instant disclosure is effective in various embodiments to generate compact video summary by exploring spatiotemporal characteristics completely.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The systems and methods disclosed herein can be combined in various was as would be appreciated by a person of ordinary skill in the art. For example, various architecture elements can be combined from the various embodiments disclosed, or various method steps (such as various calculations) can be combined as would be within the understanding of a person of ordinary skill in the art. Further, references to "a particular embodiment" and the like refer to features that are present in at least one embodiment of the systems or methods disclosed herein. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting.

In various embodiments, the phrase "digital content record", as used herein, refers to any digital content record, such as a digital still image, a digital audio file, or a digital video file.

It should be noted that, unless otherwise explicitly noted or required by context, the word "or" is used in this disclosure in a non-exclusive sense.

Figure 1:
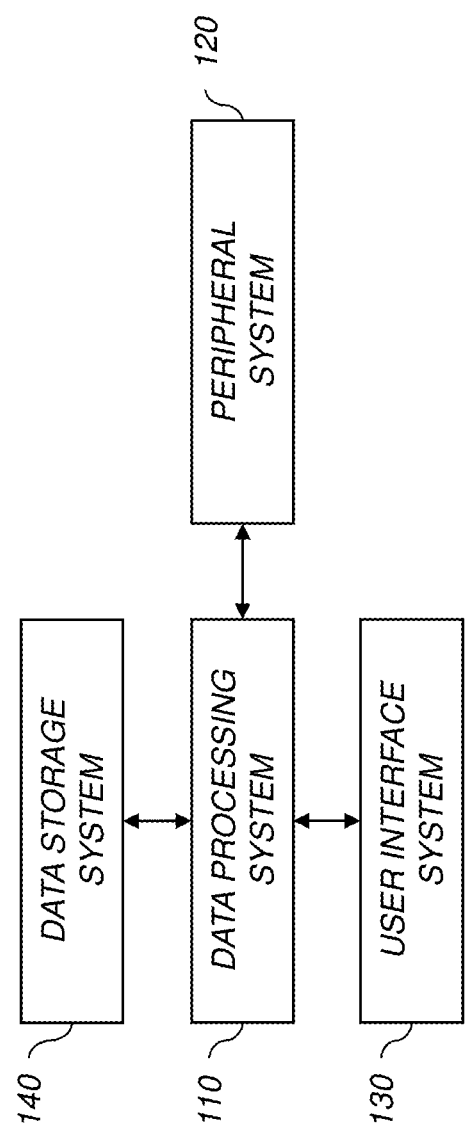
FIG. 1 illustrates is an embodiment of a high-level diagram showing the components of a system for navigating and summarizing a video sequence.

FIG. 1 is high-level diagram showing the components of a system for navigating and summarizing a video sequence according to an embodiment of the present invention. In the illustrated embodiment, the system includes a data processing system 110, a peripheral system 120, a user interface system 130, and a data storage system 140. The illustrated peripheral system 120, the user interface system 130 and the data storage system 140 are communicatively connected to the data processing system 110.

The data processing system 110 of the embodiment illustrated in FIG. 1 includes one or more data processing devices that implement the processes of the various embodiments of the present disclosure, including the example processes of FIGS. 2-8 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 in one embodiment includes one or more processor-accessible memories configured to store information, including the information needed to execute the processes of the various embodiments of the present invention, including the example processes of FIGS. 2-8 described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

In various embodiments, the phrase "processor-accessible memory" includes any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" in various embodiments includes any type of connection, whether wired or wireless, between devices, data processors, or programs in which data may be communicated.

In various embodiments, the phrase "communicatively connected" includes a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

In various embodiments, the user interface system 130 also includes a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
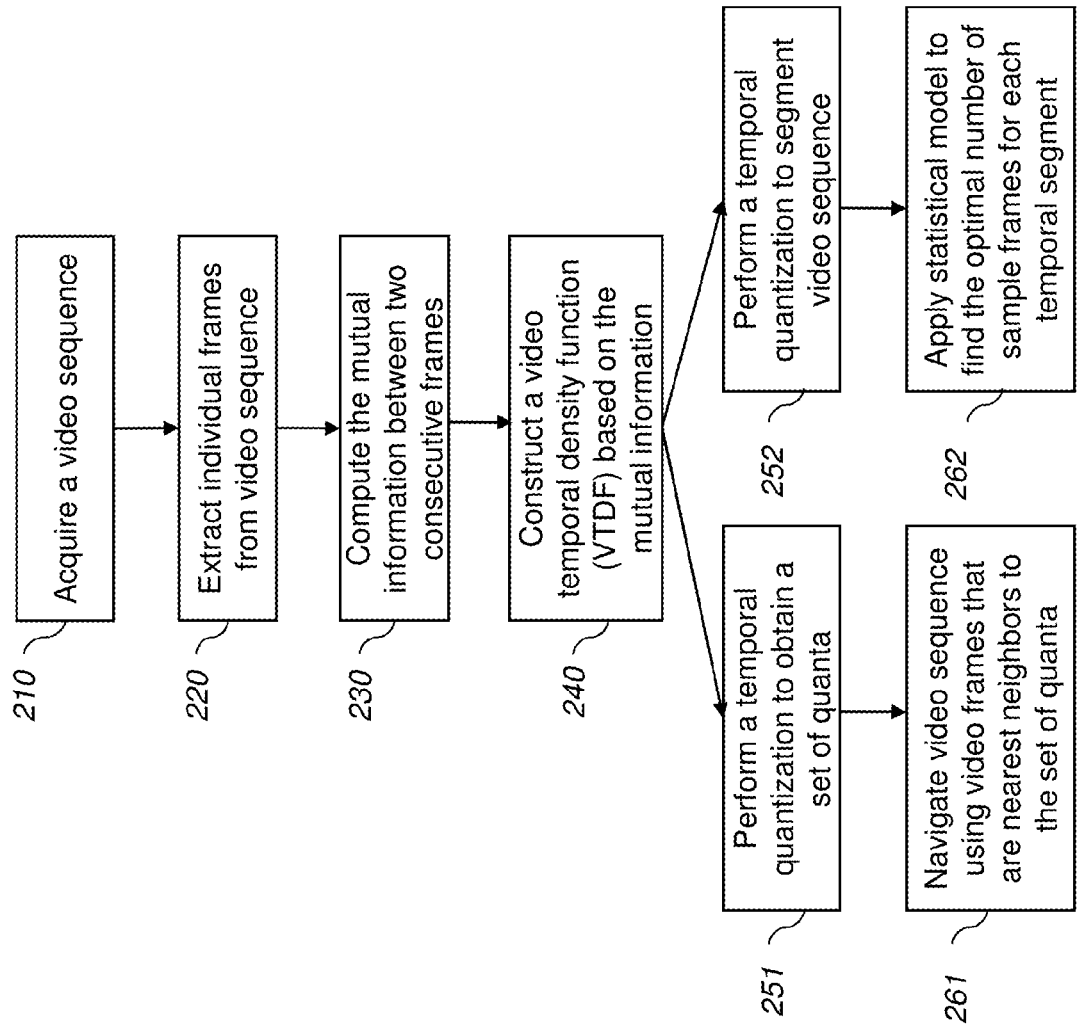
FIG. 2 illustrates is an embodiment of a block diagram showing an efficient vector quantization method to find the best samples of a video according to an embodiment of the instant disclosure.

FIG. 2 is a block diagram showing our VTDF-based methods to find the best samples of a video according to an embodiment of the present disclosure. According to the embodiment illustrated in FIG. 2, a video sequence is acquired from a memory or database 210. Then individual frames are extracted from the video sequence 220. In various embodiments, regardless of whether video summarization (TQS) or video thumbnail extraction (VTE) is to be performed, the VTDF calculation may nonetheless be the same, as illustrated by block 230 and 240 of FIG. 2. Following the VTDF calculation illustrated in blocks 230 and 240, various embodiments of the disclosed system perform a temporal quantization that is applied for TQS using the disclosed method and an existing RWBS, as illustrated in blocks 251 and 261. Alternatively or in addition, a statistical model based method can be applied for VTE, as illustrated by blocks 252 and 262.

VTDF Calculation Using Mutual Information

To calculate the mutual information between two consecutive video frames 230, one embodiment of the system and methods disclosed herein convert the color space from RGB to HSV first because HSV color space is better to match human visual system. Under HSV color space, an embodiment of the disclosed system and methods can build a 2-D color histogram along H and S axes to quantize each video frame in grey levels. In this embodiment, the system and methods disregard the V component because it is less robust to the lighting condition.

For one video with N frames, the histogram built according to one embodiment is a 16(H)×8(S), total 128 bins HSV color histogram to represent each video frame in grey level.

Based on the above HSV color histogram, a joint-probability matrix D (128×128) is used to model the grey value difference in pixel level between two consecutive frames, t and t−1. ∀0≤i, j≤127, D(i, j) is the joint probability to model that a pixel with grey value i at frame t−1 has a grey value j at frame t.

Considering frame t with $N_p$ pixels, the disclosed system and methods can explore the inter-frame dependency in pixel level using a class set $G_{ij}$, $$G_{ij}=\{k|g(t-1,k)=i, g(t,k)=j\}, \quad (1)$$

where g(t, k) is the operator to get the grey value of frame t at pixel k (1≤k≤$N_p$), and 0≤i, j≤127.

The $G_{ij}$ is used to calculate the joint probability D(i, j), $$D(i, j) = \frac{N(G_{ij})}{N_p}, \quad (2)$$

where $N(G_{ij})$ is the size of class set $G_{ij}$.

Mutual information is used to model VTDF due to its effectiveness in exploring the inter-frame dependency characteristics. As a result, the mutual information-based VTDF 240 can be calculated using the above joint-probability matrix as, $$I(t) = -\frac{1}{U_I}\sum_{i=0}^{127}\sum_{j=0}^{127} D(i, j)\log\frac{D(i, j)}{D(i, .)D(., j)}, \quad (3)$$

$$I(1) = 0, \quad (4)$$

where $U_I$ is the normalization factor. Furthermore, D(i,.) and D(.,j) are marginal probabilities.

As a quantitative representation of inter-frame visual similarity measure, the above mutual information-based VTDF is an effective way to model the temporal density and explore the dependency between two successive video frames because a large difference in content between two frames shows a weak inter-frame dependency and leads to a small value of VTDF.

Therefore, as a measure of association between two successive video frames, the above mutual information-based VTDF not only determines the quantity of information passed from one frame to another but also provides us a simple quantitative representation of video dynamics.

VTDF-Based Method for Rapid Video Navigation

In rapid video navigation, given a video sequence with N frames, one embodiment of the disclosed system and methods attempt to find an optimized solution to sample M frames (M<N) and use those M frames to represent the original N frames with the minimum semantic distortion.

For example, let X be the original sample set of frame indices, $$X=\{1,2,\ldots,N\}, \quad (5)$$

where t is used to model the t-th video frame, 1≤t≤N. In this embodiment, the partition of X, denoted by Q, is a class of sets, $$Q=\{Q_1,Q_2,\ldots,Q_M\}, \quad (6)$$

where $Q_i$ is the class set of video frames in the i-th partition, and $$\bigcup_{i=1}^{M} Q_i = X,$$

$Q_i \cap Q_j = \phi, \forall i, j$ with i≠j.

This scheme of quantization in time domain can be represented by a set of quanta q, a set of partition (boundary) T and 2M−1 members, $$q=\{q_1,q_2,\ldots,q_M\}, \quad (7)$$

$$T=\{t_1,t_2,\ldots,t_{M-1}\}, \quad (8)$$

$$q_1<t_1<q_2<t_2<\ldots<q_{M-1}<t_{M-1}<q_M. \quad (9)$$

Therefore, the class set $Q_i$ can be determined as, $$Q_i=\{t|t_{i-1}\leq t<t_i\}, \quad (10)$$

where $t_0=1$ and $t_M=N+1$.

Note that different from the conventional vector quantization method, the frames within a class set have the temporal relationship. In other words, the frames within a class in one embodiment have to be consecutive in time.

Based on the above, the instant disclosure enables reconstructing X based on the quanta set, $$X'=\{q_1,q_1,\ldots,q_M\}, \quad (11)$$

where $q_i$ ($1 \leq i \leq M$) is the quanta of each partition, which can be determined as, $$q_i = \text{cent}(Q_i), \tag{12}$$

where cent(.) is an operator to find the quanta of partition.

Rate-Distortion theory can be applied in an embodiment to evaluate the quantization distortion as, $$R = M/N, \tag{13}$$

$$D = \frac{1}{N}\sum d(t, t') = \frac{1}{N}\left\{\sum_{i=1}^{M}\left(\sum_{t \in Q_i} d(t, q_i)\right)\right\}, \tag{14}$$

where d(.) is a predefined cost function to calculate the distortion between each quanta and its representative frame.

To solve the above optimization problem, various embodiments of the disclosed system apply existing RWBS and the above-described temporal quantization-based methods. Both of them include two components, the VTDF 240 and temporal quantization 251. The VTDF in one embodiment is used to model the inter-frame activity density in time domain using mutual information 230. The temporal quantization in one embodiment is used to explore the characteristics of video using optimal quanta and partition in time domain.

The VTDF-based video data modeling is an effective and concise way to explore the characteristics of video in time domain. Different from traditional quantization method, embodiments of the disclosed temporal quantization will make that all frames in one segment consecutive in time. The VTDF between video frames in various embodiments makes it feasible to detect the segment boundary and sample the representative frames. In an embodiment, both methods are applied in temporal quantization to find the optimal time domain codebook quanta 251.

In one embodiment, the best partition can be determined by quanta as, $$t_1 = \frac{1}{2}(q_1 + q_2)$$

$$t_2 = \frac{1}{2}(q_2 + q_3)$$

...

$$t_{M-1} = \frac{1}{2}(q_{M-1} + q_M) \tag{15}$$

Before the disclosed system and methods can apply the above formula to obtain the best partition in time domain, it is first necessary in one embodiment to find the optimal quantization codebook (quanta set). The instant disclosure proposes two methods to obtain optimal boundary and quanta iteratively. One such disclosed mechanism is RWBS and the other such proposed mechanism is the method disclosed herein.

In one embodiment, RWBS is applied to the disclosed temporal quantization method because RWBS is an effective and efficient solution to solve such global optimal problem above. Therefore, the disclosed system and methods can use RWBS to obtain a set of quanta 251. For example, the disclosed system and methods can optimize the quanta set iteratively. Based on a predefined criterion, the "worst" quanta point can be found and used as a way to generate a new "better" quanta point to replace the worst one iteratively.

In an embodiment, the VTDF I(t) is used as the weight to measure the semantic importance of frame t and define the cost function of quantization. Given class set $Q_i$ and its quanta $q_i$, $1 \leq i \leq M$, the disclosed system and methods can define the following VTDF-based cost function to model the quantization error, denoted by $e(q_i)$, $$e(q_i) = \sum_{t \in Q_i} d(t, q_i) = \sum_{t \in Q_i} (t - q_i)^2 I(t). \tag{16}$$

Distortion can be calculated as, $$D = \frac{1}{N}\sum d(t, t') = \frac{1}{N}\left\{\sum_{i=1}^{M}\left(\sum_{t \in Q_i} d(t, q_i)\right)\right\} = \frac{1}{N}\left(\sum_{i=1}^{M} e(q_i)\right). \tag{17}$$

Based on the above cost function, the indices of the best quanta and the worst quanta can be found as, $$\text{best} = \arg\min_i(e(q_i)), \tag{18}$$

$$\text{worst} = \arg\max_i(e(q_i)). \tag{19}$$

The quanta with best and worst as indices, denoted by $q_{best}$ and a $q_{worst}$, can be used to generate two new quanta, $$q_1^* = \sum_{i=1}^{M} \delta_i q_i, \tag{20}$$

$$q_2^* = q_{best} + (q_{best} - q_1^*), \tag{21}$$

$$\sum_{i=1}^{M} \delta_i = 1. \tag{22}$$

where the value of $\delta_i$ can be determined as, $$\delta_i = \frac{N(Q_i)}{N}, \tag{23}$$

where $N(Q_i)$ is the sample size for class set $Q_i$.

In RWBS iteration, the instant disclosure uses $q_1^*$ or $q_2^*$ to replace $q_{worst}$. After the replacement, the disclosed system sorts the updated quanta set q first before quantization error calculation. The one with smaller error will be chosen to replace $q_{worst}$ accordingly for next iteration.

The iteration will be repeated until the termination condition is met, $$|q_1^* - q_2^*| \leq \epsilon_1, \tag{24}$$

where $\epsilon_1$ is a predefined number.

The disclosed method is similar to RWBS to find the optimal quantization quanta. Inspired by probability density function (PDF) in traditional vector quantization, we propose our temporal quantization method by using VTDF.

$$q_i = \sum_{t_{i-1}}^{t_i} tI(t) / \sum_{t_{i-1}}^{t_i} I(t). \tag{25}$$

Thus, the disclosed method in one embodiment updates quanta and boundaries iteratively until the following termination condition is met, $$\frac{TMSE^{(j-1)} - TMSE^{(j)}}{TMSE^{(j-1)}} < \varepsilon_2, \quad (26)$$

where $TMSE^{(j)}$ is the value of TMSE using formula (17) in the j-th iteration (j>1). $\varepsilon_2$ is a predefined small number.

For each partition, if the optimal quanta is not an integer, the disclosed system and methods apply a nearest-neighbor-based strategy to find the representative frame t according to the VTDF value, $$\underset{t \in Q_i}{\operatorname{argmin}} |I(t) - I(\operatorname{round}(q_i))|. \quad (27)$$

As a result, the video frames that are the nearest neighbors to the quanta in the quantization codebook are sampled to navigate the video content 261.

Figure 3:
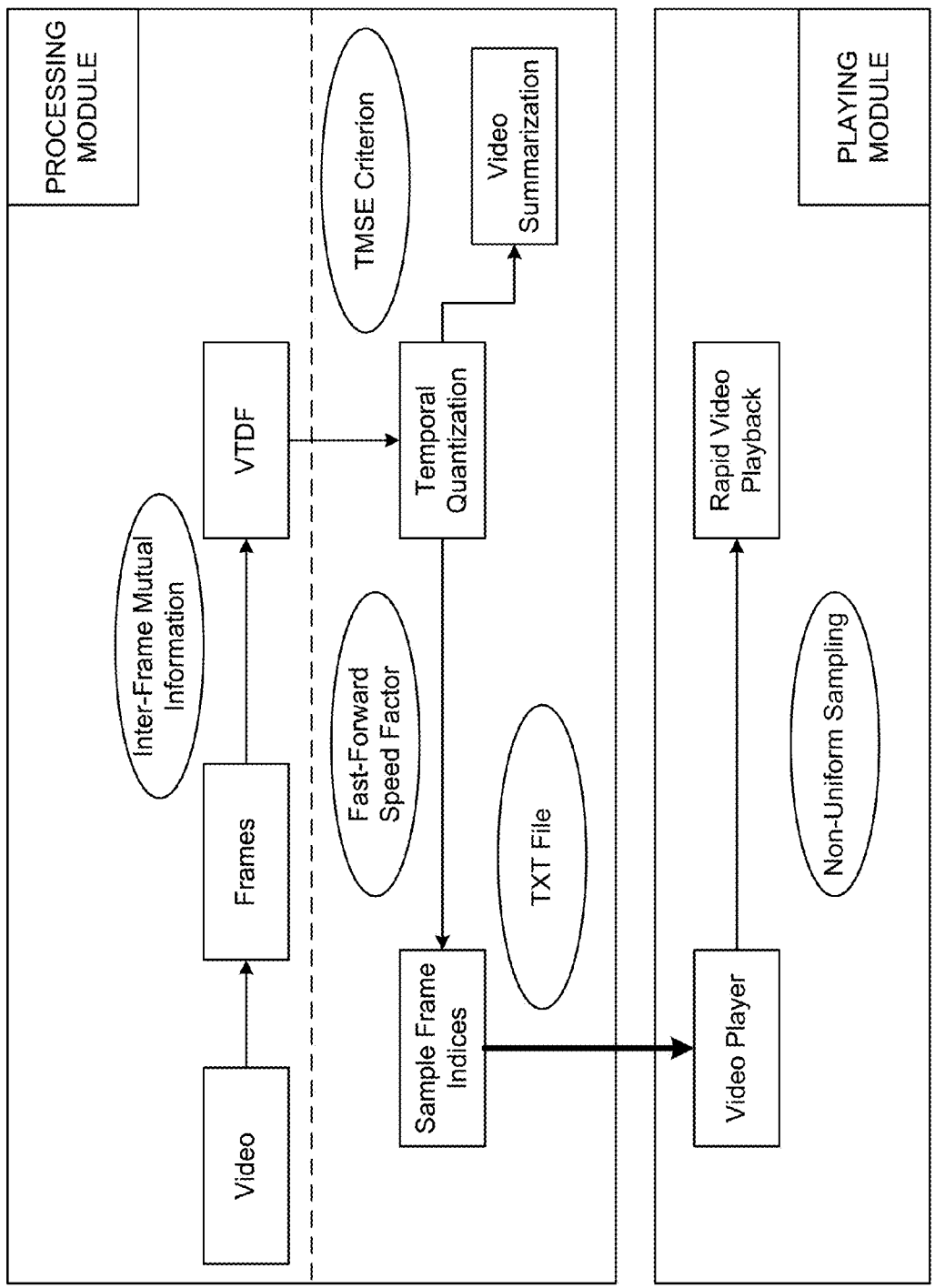
FIG. 3 illustrates is an example block diagram showing a video navigation and summarization system architecture according to an embodiment of instant disclosure.
Figure 4:
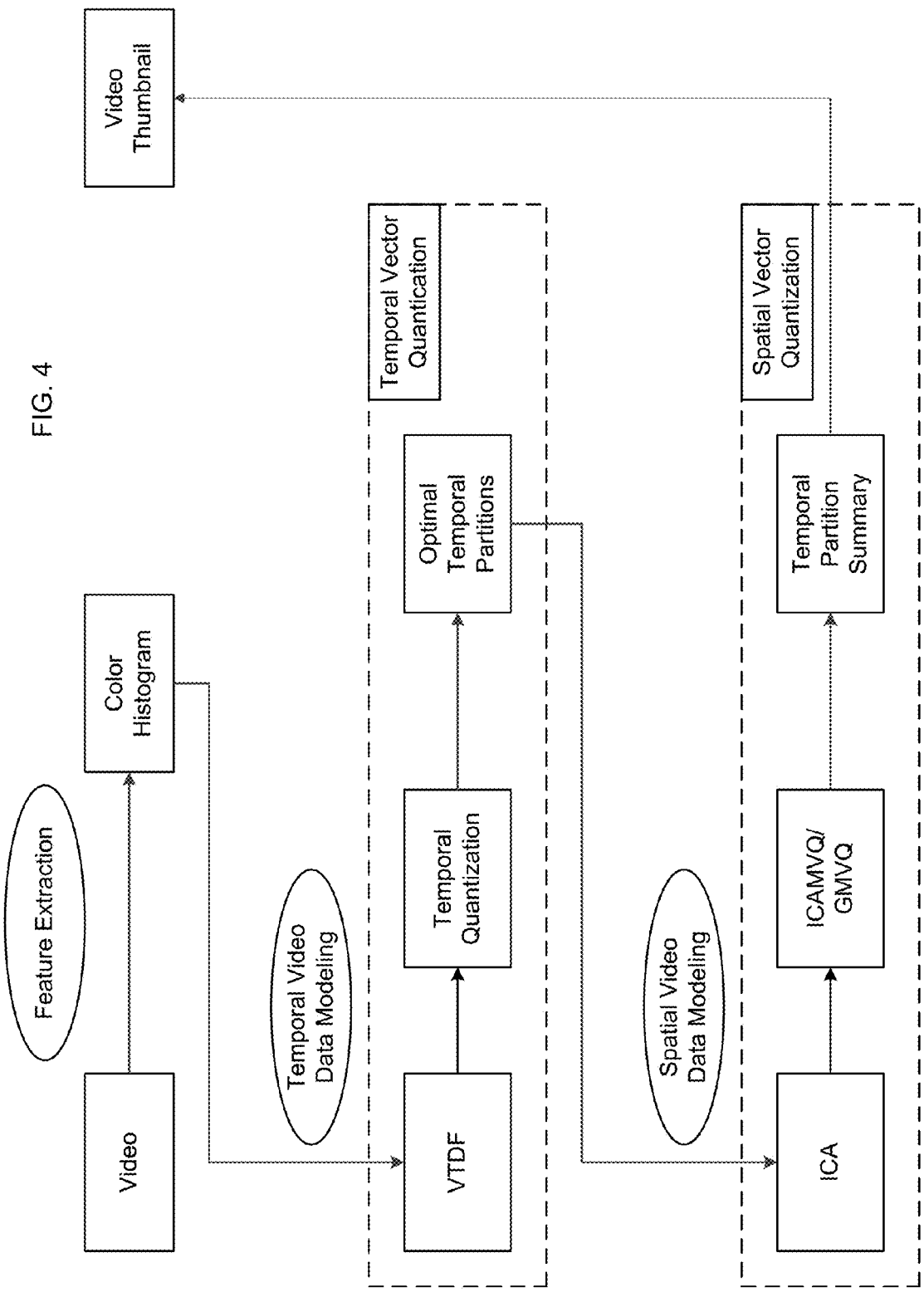
FIG. 4 illustrates is a block diagram showing an example video thumbnail extraction system architecture according to an embodiment of the instant disclosure.

FIG. 3 shows an example of the disclosed video navigation and summarization system architecture. In one embodiment, the disclosed system includes a video player, which has two fast-forward modes: traditional uniform mode and the disclosed temporal quantization based non-uniform mode, to implement the proposed rapid video navigation method in practice.

Before fast-forward playback, a parameter or factor has to be set in one embodiment to specify how fast to navigate the video content, denoted by S, S>1. Accordingly, the codebook size can be determined as, $$M = \operatorname{round}(N/S). \quad (28)$$

The video navigation and summarization system architecture disclosed in one embodiment has two functional modules: processing and playing. In the processing module, a text file TXT containing all sampled frame indices computed using the methods described above would be created as the input to the video player. In the playing module, only the sampled frames will be played and others will be skipped. In addition, a video skim or summary based on the nearest-neighbor set of representative frames as described above can be generated and stored. The whole video summarization system only has limited parts (i.e., I(t) generation) in the processing module that need to be done offline.

Motion-Based VTDF for Rapid Video Navigation

Given frame t, its previous frame $t_p$ and its next frame $t_a$, the disclosed system and methods can generate a new frame t' to represent the frame t using pixel-based frame difference in RGB color space.

$$t'(R,i) = |t_p(R,i) - t(R,i)| + |t_a(R,i) - t(R,i)|, \quad (29)$$

$$t'(G,i) = |t_p(G,i) - t(G,i)| + |t_a(G,i) - t(G,i)|, \quad (30)$$

$$t'(B,i) = |t_p(B,i) - t(B,i)| + |t_a(B,i) - t(B,i)|, \quad (31)$$

where t(R, i), t(G, i) and t(B, i) is the value of R, G, and B component at the pixel i for frame t, respectively.

The above method is a procedure to create a new image by remaining the changed pixels and eliminating unchanged ones between one frame and its two adjacent (previous and after) frames. It is an effective way to explore the motion activity because during sharp motion activities, the visual characteristics among three consecutive video frames are expected to change dramatically. After that, a new video sequence is generated to represent the original one for following processing. Accordingly, the same methods can be applied to this new video sequence to find the optimal sample frames.

VTDF Statistical Model for Video Thumbnail Extraction

Different from above VTDF-based temporal quantization for rapid video navigation, the problem in video thumbnail extraction in one embodiment is to generate compact video summary without predefined number of sample frames.

There are two relevant components in one embodiment of the disclosed VTDF statistical model. First, VTDF is applied to do video segmentation in time domain, as illustrated by block 252 of FIG. 2. For each temporal segment, statistical model is applied to extract its representative frames in spatial domain, as illustrated by block 262 of FIG. 2:

$$\frac{TMSE(M-1) - TMSE(M)}{TMSE(M-1)} < \varepsilon_3, \quad (32)$$

where TMSE(M) is the Distortion value given a specific value for the number of temporal segments, M (M≥2). $\varepsilon_3$ is a predefined small number.

Within each temporal segment $Q_i$, the disclosed system and methods employ independent component analysis (ICA) to extract its features and build a 2D compact feature space.

Considering $Q_i$ with $N(Q_i)$ frames, a raw feature space can be built in a matrix form. Each column vector in the matrix in one embodiment is the 128D histogram, H(t) (t∈$Q_i$).

$$A = [H(1) H(2) \ldots H(N(Q_i))]. \quad (33)$$

In one embodiment, the ICA learning method is performed to generate the un-mixing matrix W and the independent sources. The disclosed system and methods may only keep the two most important projecting directions to reduce the feature dimension. In this embodiment, the 2D output ICs ($IC_1(t)$ and $IC_2(t)$) are given by the product of matrices W and A. As a result, for each frame t, the disclosed system and methods model it with a new 2D compact feature vector as $x_t$.

The ICA feature is effective to explore the frame-level-based global characteristics by projecting video frames from histogram-based raw feature space into low dimensional ICA subspace.

For each temporal segment $Q_i$, Gaussian mixture (GM) and ICA mixture (ICAM) can be applied to explore its spatial characteristics and generate the thumbnails.

There are two steps in an embodiment of the process disclosed above. First, we use GM and ICAM to estimate the PDF of feature vector $x_t$ and segment the temporal segment. Second, vector quantization is applied to find the best quanta with the minimum mean square error (MSE).

In mixture model, given a temporal segment $Q_i$, its element $x_t$ has a PDF form as, $$f(x_t | \theta) = \sum_{j=1}^{K} \pi_j p_j(x_t | C_j, \theta_j), \quad (34)$$

where $\pi_j$ represents the probability of the j-th mixture component $C_j$ (1≤j≤K). $p_j(x_t|C_j,\theta_j)$ is the probability to produce $x_t$ from $C_j$ for given parameter set $\theta_j$. $\theta$ is the class set of $\theta_j$. K is the total mixture components.

All $x_t$ produced by $C_j$ (maximum probability) become a class set $Q_{ij}$ within each $Q_i$. And $\forall j,k (1 \leq j, k \leq K)$ with $j \neq k$, $$\bigcup_{j=1}^{K} Q_{ij} = Q_i \text{ and } Q_j \cap Q_k = \phi. \quad (35)$$

The disclosed system and methods use the maximum log likelihood function for parameter estimation in one embodiment.

$$\hat{\theta}_j = \underset{\theta_j}{\operatorname{argmax}} (\log(p_j(x_t \mid \theta))). \quad (36)$$

In GM, $\theta_j$ can be considered as a set with three parameters, $$\theta_j = (\pi_j, \mu_j, \Sigma_j), \quad (37)$$

where $\mu_j$ and $\Sigma_j$ are the mean and covariance matrix, respectively.

Therefore, $p_j(x_t \mid \theta_j)$ can be calculated as, $$p_j(x_t \mid \theta_j) = \frac{1}{\sqrt{(2\pi)^d |\Sigma_j|}} e^{-\frac{1}{2}(x_t - \mu_j)^T \Sigma_j^{-1} (x_t - \mu_j)}, \quad (38)$$

where d (d=2) is the dimension or frame vector $x_t$.

Expectation maximum (EM) algorithm can be used to estimate the parameters iteratively:

$$\pi_j = \frac{N(Q_{ij})}{N(Q_i)}, \quad (39)$$

$$\mu_j = \frac{1}{N(Q_{ij})} \sum_{x_t \in Q_{ij}} x_t, \quad (40)$$

$$\sum_j = \frac{1}{N(Q_{ij})} \sum_{x_t \in Q_{ij}} (x_t - \mu_j)(x_t - \mu_j)^T, \quad (41)$$

where N(.) is the operator to get the size of class set.

In ICAM, $\forall x_t \in Q_{ij}$, $x_t$ is modeled by a standard ICA model, $$x_t = A_j S_j + b_j, \quad (42)$$

where $A_j$ is the ICA basis coefficients and $b_j$ is the mean coefficients for the mixtures. And $S_j$ is the hidden source.

Therefore, $\theta_j$ can be considered as a set with three different parameters as, $$\theta_j = (\pi_j, A_j, b_j). \quad (43)$$

And EM is applied to calculate the parameters iteratively, $$\pi_j = \frac{N(Q_{ij})}{N(Q_i)}, \quad (44)$$

$$b_j = \frac{\sum_{t=1}^{N(Q_i)} \pi_j x_t}{\sum_{t=1}^{N(Q_i)} \pi_j}, \quad (45)$$

$$\Delta A_j \propto \frac{p(x_t \mid C_j, \theta_j) \pi_j}{\sum_{j=1}^{K} (p(x_t \mid C_j, \theta_j) \pi_j)} \frac{\partial}{\partial A_j} \log p(x_t \mid C_j, \theta_j), \quad (46)$$

where N(.) is the operator to get the size of class set.

The MSE can be used to measure the above quantization error. The MSE and termination condition of iteration is calculated as, $$Q_{error} = \frac{1}{K} \left( \sum_{j=1}^{K} \frac{\sum_{x_t \in Q_{ij}} \|q_{ij} - x_t\|^2}{N(Q_{ij})} \right), \quad (47)$$

$$q_{ij} = \frac{1}{N(Q_{ij})} \sum_{x_t \in Q_{ij}} x_t, \quad (48)$$

$$\frac{Q_{error}(l-1) - Q_{error}(l)}{Q_{error}(l-1)} < \varepsilon_4, \quad (49)$$

where $Q_{error}^{(l)}$ is the quantization error in the I-th iteration, $I > 1$. $\varepsilon_4$ is a predefined small number.

Bayes information criterion (BIC) can be employed in various embodiments as an optimal criterion to determine the optimal quantization codebook size, the value of K, $$BIC = -2 \times \log f(x_t \mid \theta) + p \times \log(N(Q_i)), \quad (50)$$

where p (p=3K) is the number of parameters for estimation.

The above BIC criterion is based on a trade-off between performance and number of parameters used for describing the mixture distribution. The K caused the smallest BIC will be considered as the optimal codebook size.

The representative video frame $s_{ij}$ can be determined as, $$s_{ij} = \underset{x_t \in Q_{ij}}{\operatorname{argmin}} \|x_t - q_{ij}\|^2, \quad (51)$$

where $s_{ij}$ is used to summarize the segment $Q_{ij}$.

In various embodiments, other segments can do in a similar way to generate the whole video thumbnails.

EXPERIMENTAL RESULTS

To show the effectiveness and efficiency of the instant disclosure, the system and method disclosed herein were tested on a collection of videos. An aquarium video is used as an example shown in FIG. 5.

Figure 5:
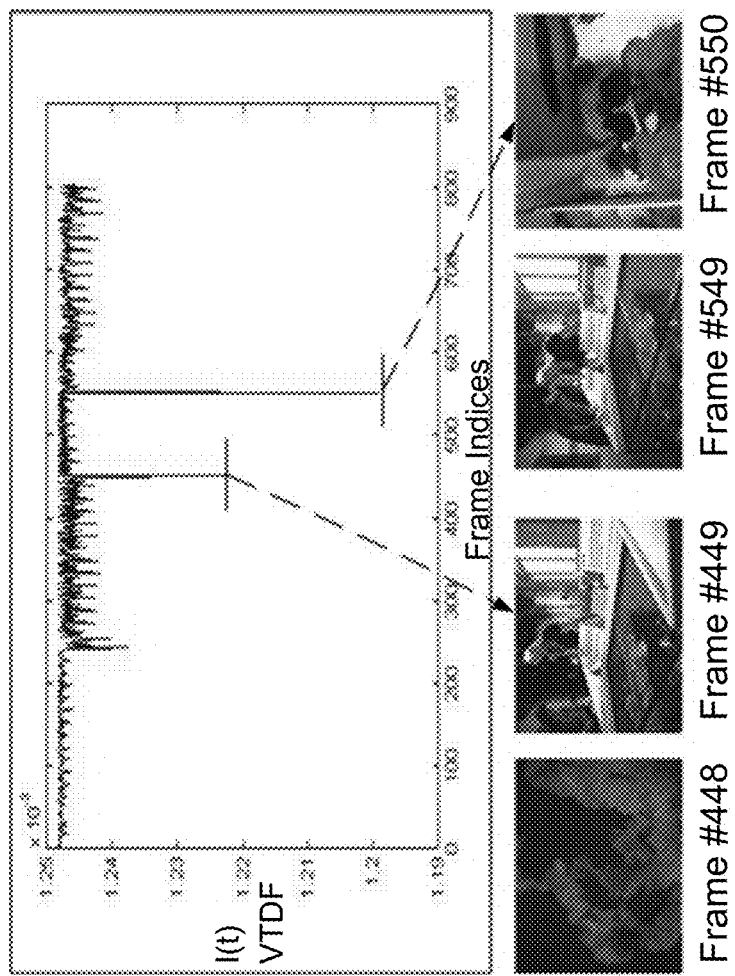
FIG. 5 illustrates a sample VTDF of the example aquarium video.

The VTDF of the example aquarium video is shown on the top of FIG. 5. To describe its discrimination to detect the segment boundary and sample the representative frames in time domain, the disclosed system and methods use two non-zero small values of VTDF to demonstrate this. In the illustrated embodiment, representative video frames (frame #449 and frame #550) and the previous video frames (frame #448 and frame #549) are illustrated on the bottom of FIG. 5, which effectively indicates that VTDF is discriminative to explore the activity dynamics of video because the small value of VTDF means a weak inter-frame dependency and a large difference in video semantic content.

Figure 6:
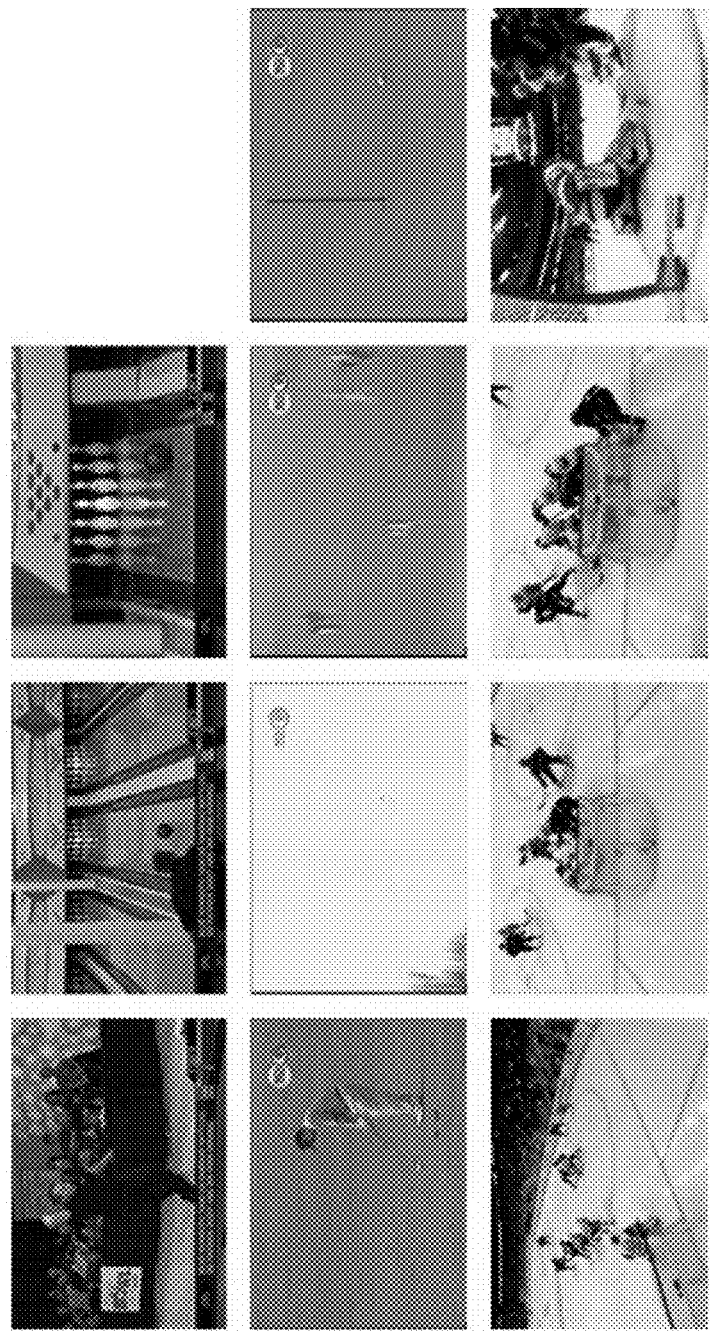
FIG. 6 illustrates some sample results of various sports videos.
Figure 7:
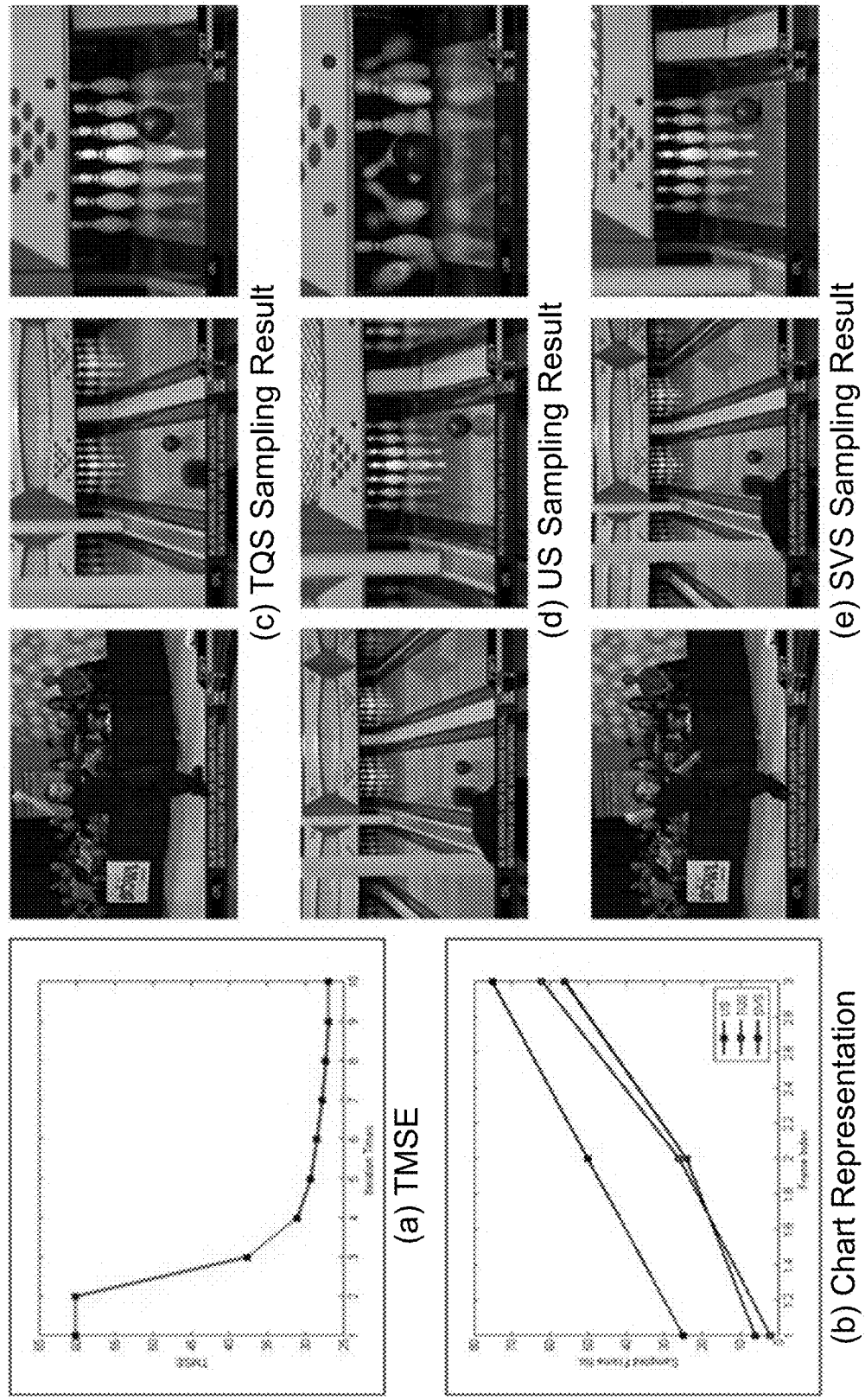
FIG. 7 illustrates a comparison of three sampling methods of the example bowling video.

FIG. 6 shows a plurality of sample frames of three sports videos, which demonstrate that the system and methods disclosed herein are effective to grasp the semantic information of three videos.

To show the effectiveness of the disclosed method, the disclosed method (TQS) is compared with uniform sampling (US) and an existing method (SVS) in as are known in the prior art. FIG. 7(a) illustrates an example of why the disclosed method only needs several iteration steps. FIG. 7(b) is the chart representation of three methods (x-axis: Frame Index, y-axis: Sampled Frame No.), which clearly indicates that the disclosed quantization method is a non-uniform sampling while the traditional fast-forward method is a uniform sampling. FIG. 7(c), (d), and (e) show the sample frames layout of those three methods in an example bowling video. The results demonstrate that the method disclosed herein can extract the salient information (ball swing motion) ignored by the uniform sampling in addition to capturing the semantic information provided by it.

Figure 8:
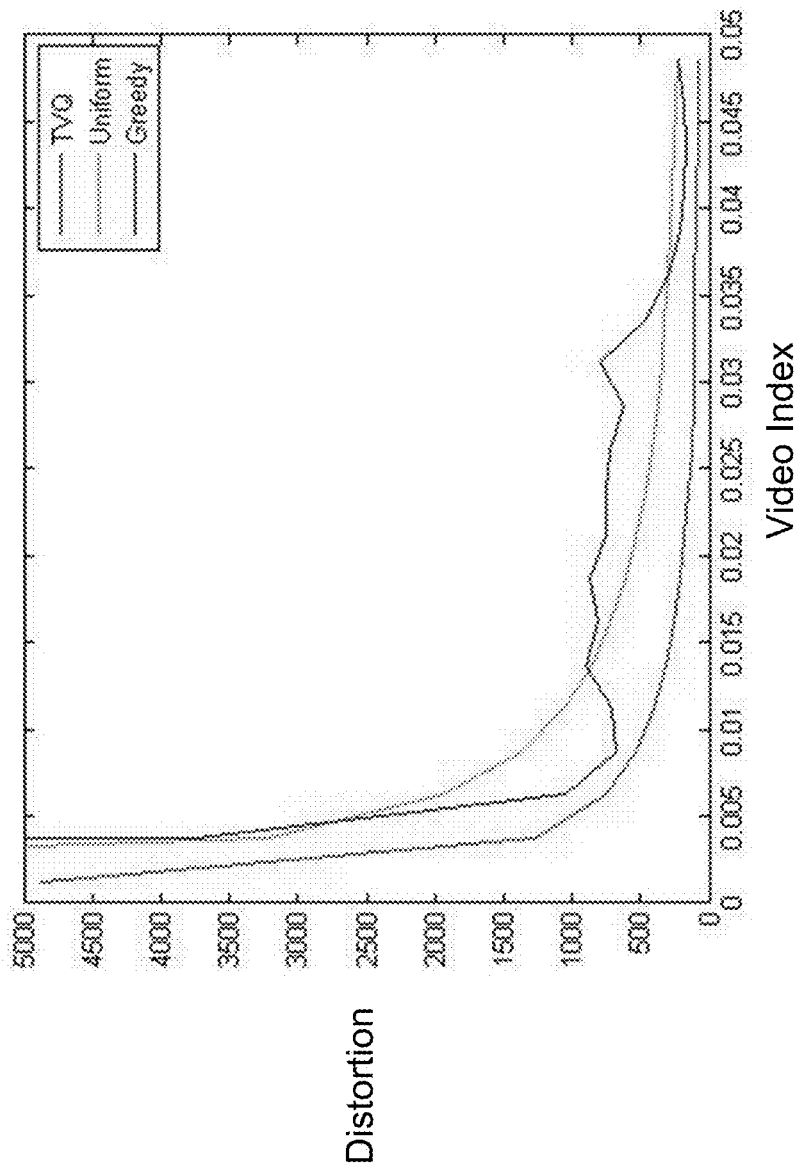
FIG. 8 illustrates an example Rate-Distortion chart of three disclosed sampling methods.

FIG. 8 is another example comparison based on a Rate-Distortion chart. In the illustrated embodiment, the Distortion for three methods is calculated based on the Rate for one randomly selected video from a video collection and show in FIG. 8, which clearly indicates that the disclosed method has smaller distortion.

Figure 9:
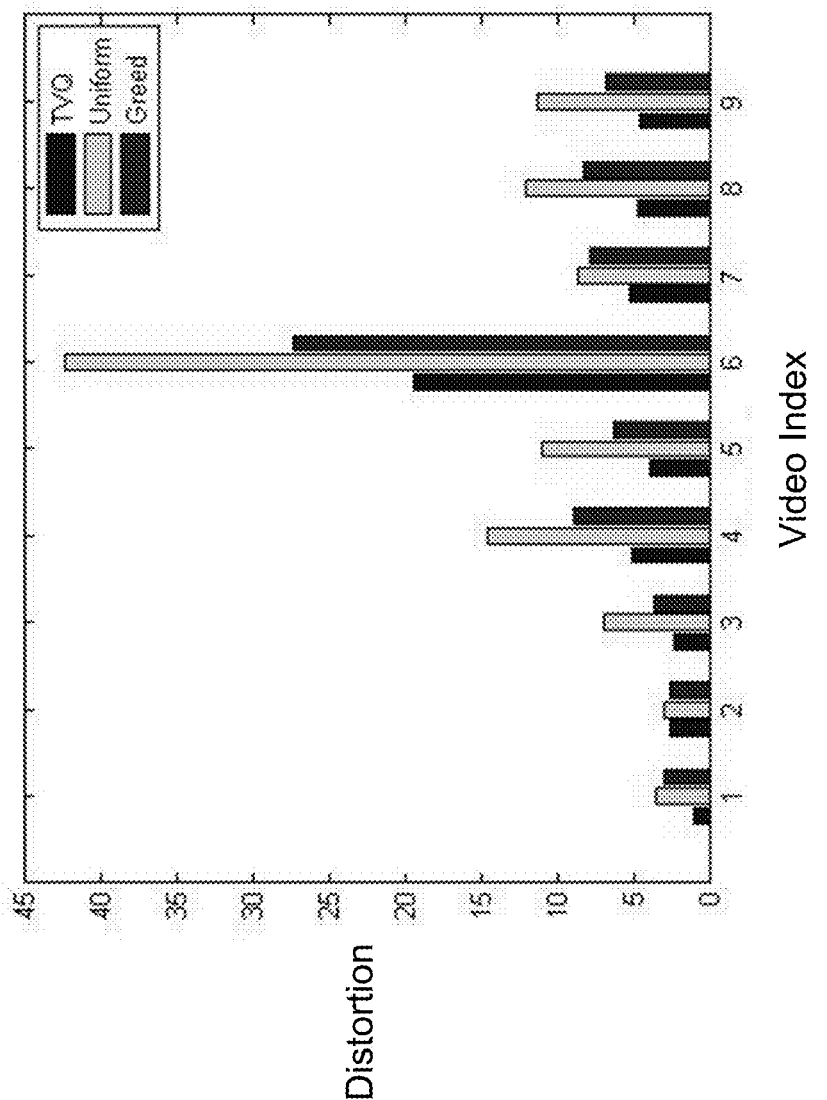
FIG. 9 illustrates an example Distortion bar chart of ten test videos for three disclosed sampling methods.

FIG. 9 is an example Distortion bar chart for 10 test videos of three methods, which chart clearly demonstrates that our method has smaller distortion than other two methods.

Figure 10:
FIG. 10 illustrates an example of motion-based VTDF in hockey video.

FIG. 10 shows an example of how to generate a new image using the disclosed pixel-level frame difference-based method to calculate the motion-based VTDF. A hockey video is used as an example. FIG. 10 shows three time continuous frames and the new image generated by the disclosed method to represent the middle frame. The new image clearly describes the motion regions including both local motion (moving players) and global motion (camera).

Figure 11:
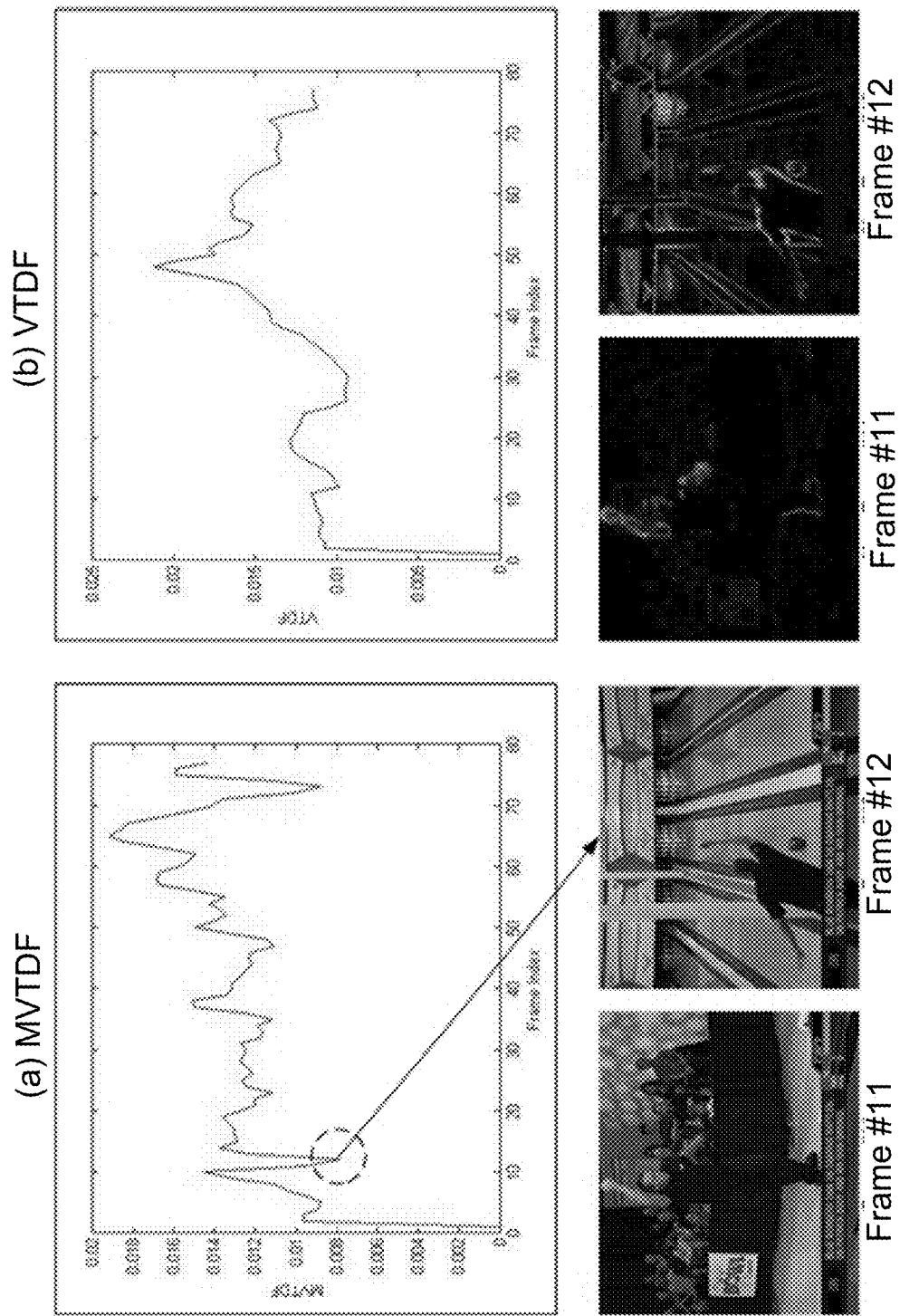
FIG. 11 illustrates a comparison between VTDF and MVTDF in an example bowling video.

FIG. 11 shows the effectiveness of the disclosed MVTDF for the previously discussed bowling video. In the illustrated embodiment, the inter-frame mutual information is calculated on the new video sequence and show the MVTDF in FIG. 11(a). For comparisons, the inter-frame mutual information, VTDF, calculated on the original video sequence, is shown in FIG. 11(b). For one non-zero small value of MVTDF (circled in FIG. 11(a)), the illustrated embodiment of FIG. 11 lays out the video frames and their previous ones for two video sequences, which are shown on the bottom of FIG. 11. FIG. 11 further indicates that MVTDF is more discriminative to explore the motion activity dynamics of video because the small MVTDF value means a weak inter-frame dependency and a large difference in motion content.

Figure 12:
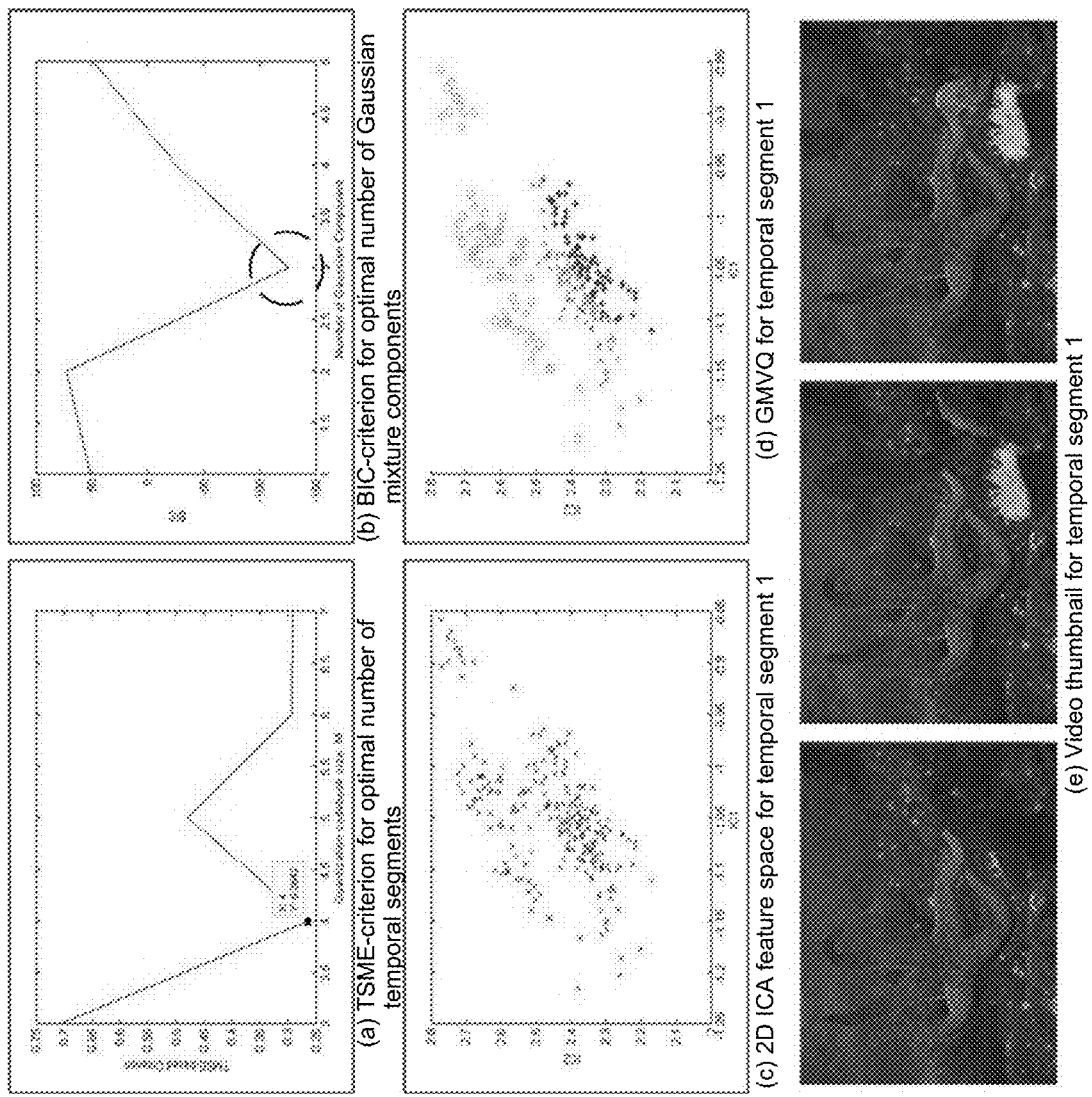
FIG. 12 illustrates an example of VTDF and Gaussian mixture in an example aquarium video.

FIG. 12 shows the an example of the disclosed procedure of video thumbnail extraction using VTDF and Gaussian mixture. In the illustrated embodiment, the TMSE-based criteria are calculated and shown in FIG. 12 (a), from which it can be concluded that the optimal temporal partition number is 4. For the first temporal partition, the disclosed method applies GM to it. The optimal number of the Gaussian mixture component is determined by BIC-based criterion. From the example of FIG. 12 (b), it can be seen that 3 is the optimal number. In the ICA subspace, all frames in the first temporal partition are quantized into three Gaussian components. FIG. 12 (c) illustrates the raw 2D ICA feature space for temporal partition 1. In FIG. 12 (d), one color represents one Gaussian component. The 3-frame video thumbnail is shown in FIG. 12 (e). In FIG. 12 (e), the complete fish movement (fade-in-fade-out) is sampled effectively.

Figure 13:
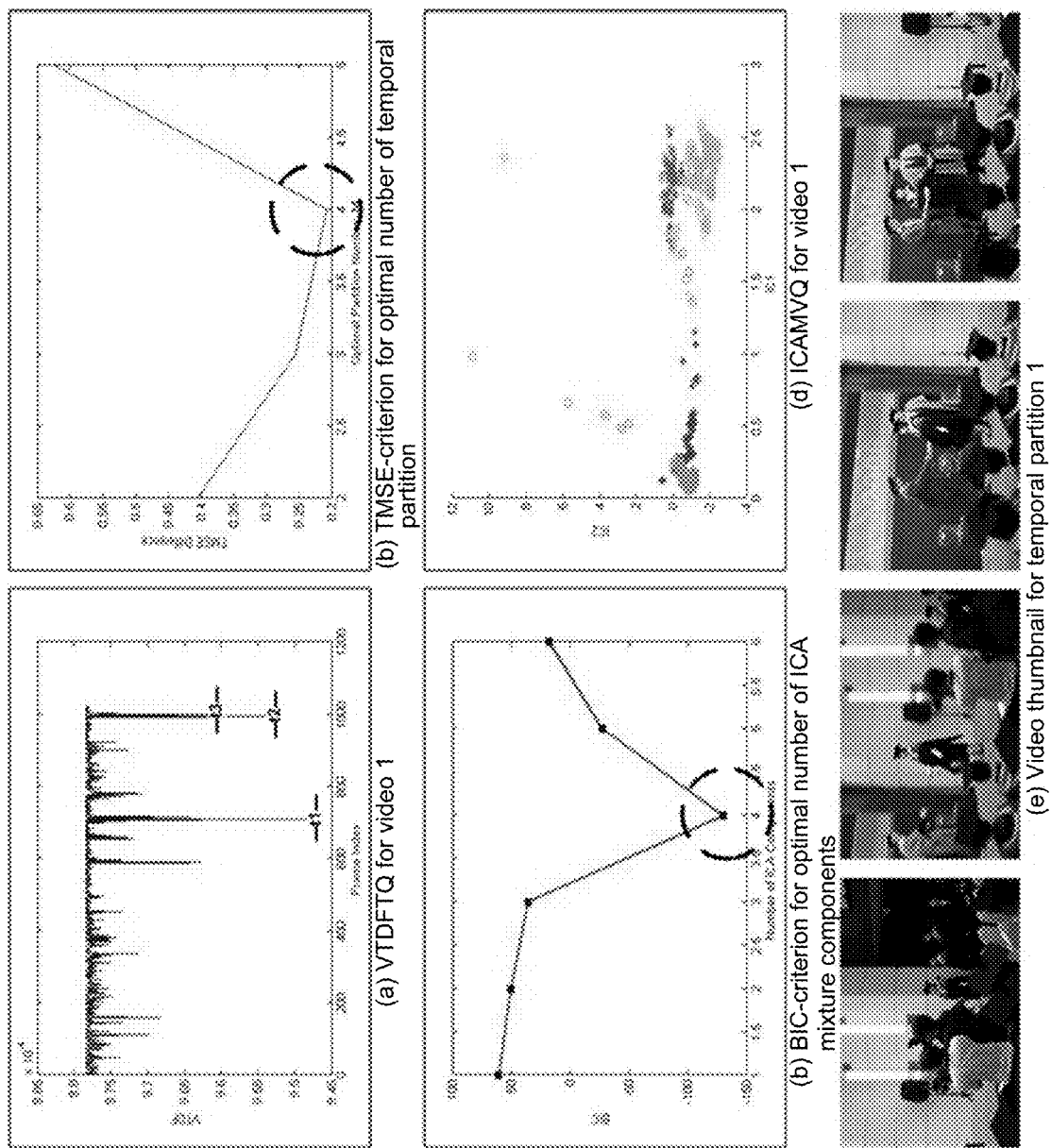
FIG. 13 illustrates an example of VTDF and ICA mixture in an example graduation video.

FIG. 13 shows an example of the procedure of video thumbnail extraction using VTDF and ICA mixture. The TMSE-based criterion is shown in FIG. 13 (b), from which it can be concluded that the optimal number of temporal segments is 4. In FIG. 13 (a), three boundaries are labeled. ICA mixture is applied to each segment and the optimal number of ICA mixture component is determined by BIC-based criterion. From FIG. 13 (c), the disclosed method can be used to determine that 4 is the optimal number of sample frames in the first temporal segment. In the ICA subspace, all frames in the first segment are quantized into four ICA components. In FIG. 13 (d), one color represents one ICA component. FIG. 13 (e) shows a 4-frame thumbnail for this segment.

Figure 14:
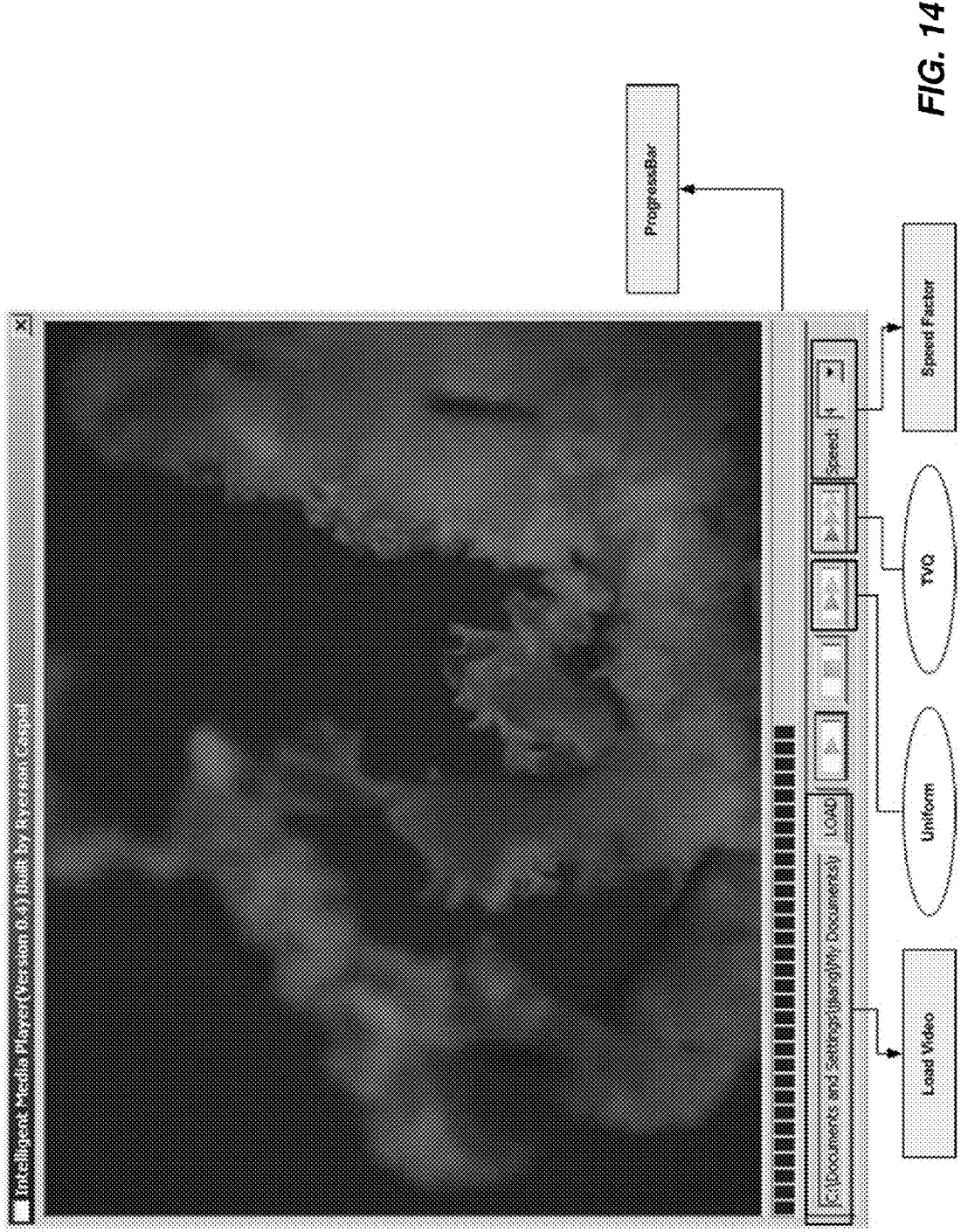
FIG. 14 illustrates a video player graphical user interface (GUI) implemented using an embodiment of the present invention.

FIG. 14 shows an example video player GUI built in Java using the system and methods disclosed herein. The implementation of video player demonstrates that the proposed non-uniform method described in this embodiment provides a better way for rapid video navigation.

It should be appreciated that the exemplary embodiments disclosed herein are merely illustrative of the present disclosure and that many variations of the above-described embodiments can be devised by one skilled in the art without departing from the scope of the invention. It is therefore intended that all such variations be included within the scope of the following claims and their equivalents.

The invention is claimed as follows:

1. A fast-forwarding video content system comprising:
   at least one display device;
   at least one processor; and
   at least one memory device storing a plurality of instructions which, when executed by the at least one processor, causes the at least one processor to operate with the at least one display device to:
   a) display a video sequence;
   b) determine a fast-forward speed factor;
   c) calculate a similarity measure between two consecutive frames of the video sequence;
   d) construct a video temporal density function (VTDF) based on the similarity measure;
   e) perform a temporal quantization of the video temporal density function to determine a set of quanta based on the determined fast-forward speed; and
   f) display a set of sampled video frames based on the determined set of quanta.

2. The fast-forwarding video content system of claim 1, wherein the similarity measure includes a set of mutual information.

3. A video fast navigation system comprising:
   at least one storage device;
   at least one processor; and
   at least one memory device storing a plurality of instructions which, when executed by the at least one processor, causes the at least one processor to operate with the at least one storage device to:
   a) acquire a video sequence stored on the storage device;
   b) compute a similarity measure between two consecutive frames of the video sequence;
   c) construct a video temporal density function (VTDF) based on the similarity measure;
   d) perform a temporal quantization of the video temporal density function to determine a set of quanta; and
   e) store an indication of a set of video frames determined to be nearest neighbors to the set of quanta.

4. A method for fast navigation of a video sequence using a video temporal density function (VTDF) comprising the steps of:
   a) causing at least one processor to acquire a video sequence from a storage device, said video sequence being in the video domain;
   b) causing the at least one processor to compute a similarity measure between two consecutive frames of the video sequence;
   c) causing the at least one processor to construct a video temporal density function (VTDF) in a domain that is a transform of the video domain based on the similarity measure;
   d) causing the at least one processor to perform a temporal quantization of the video temporal density function to determine a set of quanta; and
   e) enabling navigation of the video sequence using a set of video frames determined to be nearest neighbors to the set of quanta.

5. The method of claim 4, wherein the similarity measure includes a set of mutual information.

6. The method of claim 4, wherein causing the at least one processor to perform the temporal quantization includes causing the at least one processor to use a repeated weighted boosting search (RWBS) algorithm to optimally determine the set of quantization quanta.

7. The method of claim 4, wherein enabling navigation includes causing the at least one processor to determine a video summary using the video frames determined to be the nearest neighbors to the set of quanta.

8. The method of claim 4, wherein the domain that is the transform of the video domain is a motion domain.

9. A method for fast navigation of a video sequence using a video temporal density function (VTDF) comprising the steps of:
   a) causing at least one processor to acquire a video sequence from a storage device, said video sequence being in the video domain;
   b) causing the at least one processor to compute a similarity measure between at least a portion of at least two frames of the video sequence;
   c) causing the at least one processor to construct at least one video temporal density function (VTDF) based on the similarity measure;
   d) causing the at least one processor to perform a temporal quantization of the video temporal density function to determine a set of quanta; and
   e) enabling navigation of the video sequence using a set of video frames determined to be nearest neighbors to the set of quanta.

10. The method of claim 9, wherein the step of causing the at least one processor to compute the similarity measure includes causing the at least one processor to compute the similarity measure based on at least a portion of each of two frames.

11. The method of claim 9, wherein the step of causing the at least one processor to compute the similarity measure includes causing the at least one processor to compute the similarity measure based on a portion but not an entirety of each of two frames.

12. The method of claim 9, wherein the step of causing the at least one processor to compute the similarity measure includes causing the at least one processor to compute the similarity measure based on more than two frames.

13. The method of claim 9, wherein the step of causing the at least one processor to compute the similarity measure includes causing the at least one processor to compute the similarity measure for two frames separated from each other by less than a designated number of frames.

14. The method of claim 13, wherein the designated number of frames is one frame, such that the two frames are neighboring frames.

15. The method of claim 14, wherein the VTDF the step of causing the at least one processor to compute the similarity measure includes causing the at least one processor to compute the similarity measure based on at least a portion of each of two frames.

16. The method of claim 9, wherein the step of causing the at least one processor to construct at least one video temporal density function (VTDF) based on the similarity measure includes causing the at least one processor to construct a plurality of video temporal density functions (VTDFs) based on the similarity measure.

17. The method of claim 16, wherein at least one of the plurality of video temporal density functions (VTDFs) is in a first domain and at least one of the plurality of video temporal density functions (VTDFs) is in a second domain different from the first domain.

18. The method of claim 17, wherein the first domain is a motion-based domain.

19. The method of claim 17, wherein the first domain is an R, G, B domain.

20. The method of claim 17, wherein the first domain is an audio signal domain.

21. The method of claim 17, wherein the first domain is generated using a mathematical transform.

* * * * *